3,663,523
DICARBOXYLIC ACID FROM ROSIN AND PROCESS FOR PREPARING SAME
Bernard A. Parkin, Jr., Walter H. Schuller, and Ray V. Lawrence, Lake City, Fla., assignors to the United States of America as represented by the Secretary of Agriculture
Filed Oct. 30, 1969, Ser. No. 872,654
Int. Cl. C09f 1/00
U.S. Cl. 260—101      5 Claims

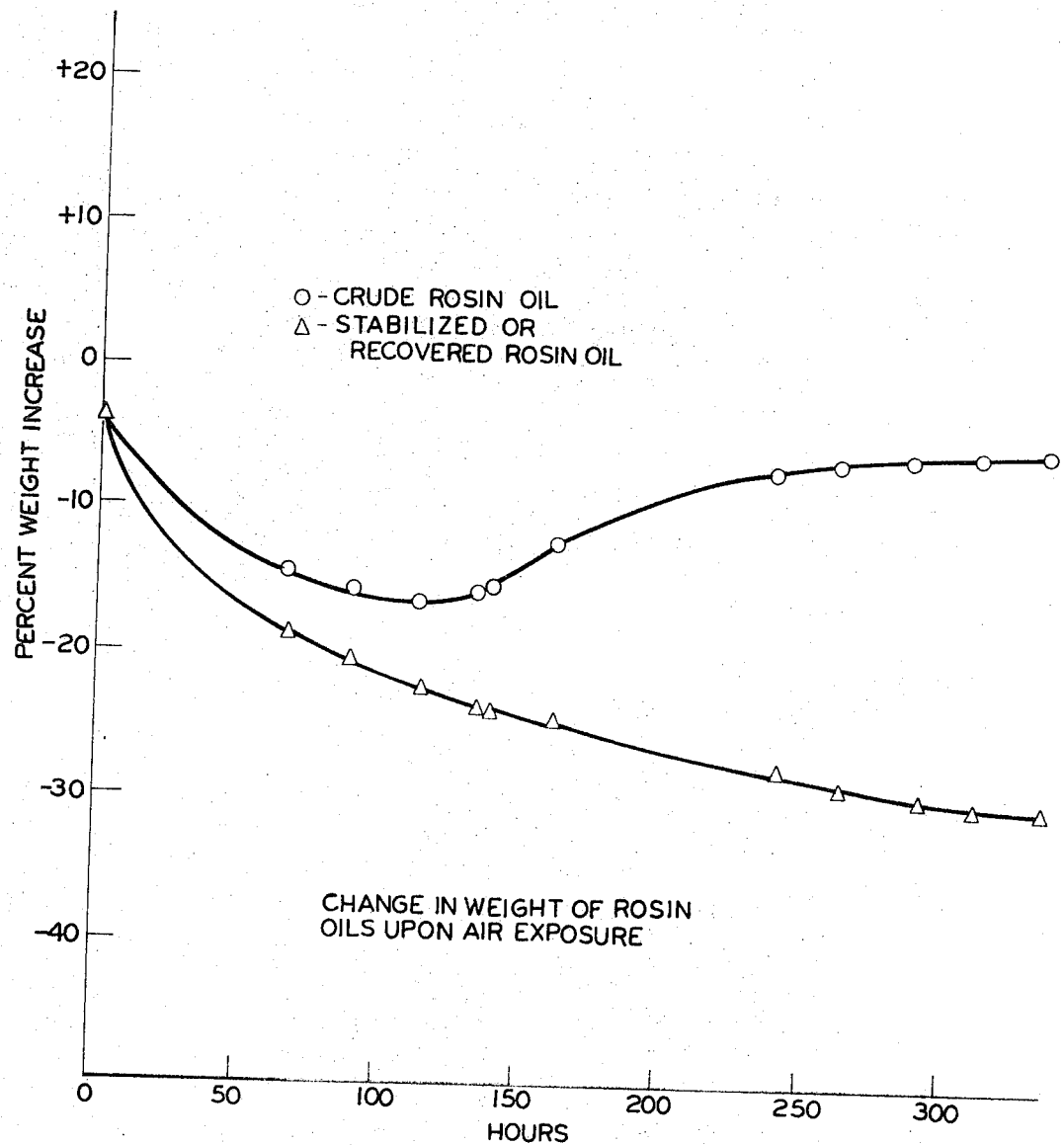

ABSTRACT OF THE DISCLOSURE

This invention relates to a new dicarboxylic acid and the preparation of same. More particularly, this invention relates to the decarboxylation of rosin in the presence of phosphoric acid and a subsequent reaction of the rosin oil with fumaric acid or maleic anhydride to yield a dicarboxylic acid or anhydride and a stabilized rosin oil.

---

A non-exclusive, irrevocable, royalty-free license in the invention herein described, throughout the world for all purposes of the United States Government, with the power to grant sublicenses for such purposes, is hereby granted to the Government of the United States of America.

Dicarboxylic acids have been prepared from rosin through the reaction of acrylic acid and β-propiolactone with the conjugated dienes present in the rosin [Ind. Eng. Chem. Prod. Res. Dev., 2 182 (1963)]. This gives one fairly reactive acid group and a very hindered resin acid carboxyl group which is rather unreactive making it somewhat undesirable in some potential applications. The present invention describes the preparation of dicarboxylic acids having approximately equal reactivity of the acid functions and a byproduct neutral rosin oil having little conjugated diene and less tendency to react with atmospheric oxygen than crude rosin oil.

Gum, wood, or tall oil rosin are decarboxylated by heating at 185°–280° C. under reduced pressure in the presence of 1–10% (preferably about 2%) of ortho phosphoric acid (commercial 85%) with distillation of the oil until a temperature of 280° at 20 mm. was obtained. The oil obtained has about one-third of the UV absorption at 242 mμ exhibited by the starting rosin. The oil was converted to the dicarboxylic acid by reacting with a dienophile, fumaric acid (2 times the amount calculated from the UV absorption), washing out the excess fumaric acid with water, dissolving the dicarboxylic acid in aqueous (0.5 M) NaOH and washing the nonreactive oils out with ether. Acidification of the alkaline solution precipitated the dicarboxylic acid which was taken up in ether and washed with water to remove salts and aqueous acid, dried and evaporated to recover the dicarboxylic acid as a friable solid. The ether solution of nonreactive oils was washed with water, dried, and evaporated to recover a stabilized neutral rosin oil.

Table I shows the yields of crude rosin oil from various rosin samples and levopimaric acid along with their specific UV absorption at 242 mμ and the percent conjugated diene calculated from these absorptions. Also shown are the yields of dicarboxylic acids with their neutral equivalents and the yield of recovered stabilized rosin oil. The stabilized oil shows little tendency to react with atmospheric oxygen. FIG. 1 shows a comparison of the weight gain of samples of crude neutral rosin oil and recovered nonreactive rosin oil resulting from the reaction of the same crude rosin oil with fumaric acid, upon air exposure. Weight loss by evaporation causes the early downward trend of both curves and continues with the nonreactive oil while the crude oil begins to gain weight as a result of reaction with atmospheric oxygen. The crude oil also darkens upon air exposure while the nonreactive oil does not.

TABLE I

| Rosin | Rosin oil | | | Stabilized[4] rosin oil, percent yield[5] | Dicarboxylic acid | |
|---|---|---|---|---|---|---|
| | Percent yield[1] | a[2] | Percent diene[3] | | Yield[6] | N.E.[7] |
| Gum: | | | | | | |
| #1 | 87.1 | 31.4 | 33.0 | 51.2 | 35.6 | 211 |
| #2 | 84.7 | 31.4 | 33.0 | 60.2 | 34.1 | 204 |
| #3 | 88.0 | 26.1 | 27.5 | 56.7 | 31.3 | 236 |
| Levo[8] | 72.6 | 35.8 | 37.7 | 41.6 | 49.3 | 199 |
| Wood: | | | | | | |
| #1 | 75.4 | 22.9 | 24.1 | 62.3 | 29.1 | 227 |
| #2 | 81.5 | 35.9 | 37.8 | 52.6 | 32.5 | 226 |
| Tall oil | 82.9 | 28.4 | 30.0 | 38.0 | 31.8 | 223 |

[1] Based on rosin acid content of starting rosin.
[2] Specific absorption coefficient at λ=245 mμ.
[3] Based on U.V. data.
[4] Rosin oil recovered from Diels-Alder reaction of crude rosin oil.
[5] Based on rosin oil used.
[6] Based on rosin oil used and neutral equivalent on final acid.
[7] Neutral Equivalent.
[8] Purified levopimaric acid.

The use of catalytic agents commonly in the literature such as iodine, quinoline and fuller's earth and thermal decarboxylation give oils containing low concentrations of conjugated dienes which are generally unsuited for formation of the dicarboxylic acid.

The following example illustrates but does not limit the scope of this invention.

EXAMPLE 1

300 parts of gum rosin (neutral equivalent 346) having a specific absorption coefficient $a$ of 44.1 at 242 mμ after isomerization of abietic-type acid (indicating 62% conjugated dienic resin acids) were placed in a flask with 6 g. of 85% phosphoric acid and heated under 40 mm. pressure to distill the oil as formed. Distillation generally started at about 160° and it was terminated at 280° at 40 mm. pressure. The oil, 188 parts, was a mobile, yellow liquid having an $a$ at 242 mμ of 31.4. Assuming a molecular weight of 257 for the oil, this indicates about 33% conjugated diene.

100 parts of the above rosin oil was heated with 30 parts of fumaric acid for 20 hours at 200° C. The mixture was taken up in ether, filtered to remove insoluble fumaric acid and washed with water until the wash showed a pH of 6–7. The ether solution was then extracted with 0.5 M NaOH solution until the extracting solution remained strongly alkaline. The combined alkaline extracts were then washed with ether. The original ether solution and the ether wash were combined, dried, and evaporated to recover the stabilized rosin oil, 60.2 parts. The aqueous alkaline solution was acidified and extracted with ether. The ether extract was washed with water, dried and evaporated to recover the dicarboxylic acid, 55 parts, having a neutral equivalent of 204.

Table I shows the results of this and other runs made in the same manner with gum, wood, and tall oil rosins and levopimaric acid.

A dicarboxylic acid anhydride may also be prepared as follows. 100 parts of the rosin oil was heated with 30 parts of a dienophile, maleic anhydride, for 4 hours at 275° C. and the product was worked up as indicated in the fumaric acid reaction above. Acidification of the extracted alkali solution yields an anhydride 61 parts N.E. 211 which is isolated as the acid above.

Reaction of the rosin oil with fumaric acid may also be effected at 275° in about 4 hours. Isolation of the products is a previously indicated. Somewhat higher yields are obtained by this procedure.

The stabilized rosin oil is useful in any application in which stabilized or non-oxidizing rosin oil would be desirable such as sette greases, printing ink, etc.

The dicarboxylic acid was reacted with fumaric acid and diethylene glycol in mole ratios of 1:2:3 by heating at 200° C. for 24 hours. The resulting polyester resin was completely soluble in styrene. Mixtures of the polyester and styrene (30 and 35% styrene) were made and polymerized using 1% benzoyl peroxide at 100° for 4 hours and 180° for 1 hour. The resulting resins were hard tough materials showing no visible effect on immersion in water, 30% $H_2SO_4$, 10% NaOH, 50% aqueous ethanol and toluene for 7 days. Almost no weight gain or hardness loss was observed on immersion in the aqueous reagents and only minor effects were noted in the alcohol and toluene. The demonstrated resistance to alkali is exceptionally good for polyester resins.

We claim:
1. A process for preparing a Diels-Alder adduct which process comprises:
   (a) distilling a material, selected from a group consisting of gum rosin, wood rosin, and tall oil rosin, in the presence of phosphoric acid at a temperature of about 180° C. to 280° C. and under reduced pressure;
   (b) reacting the distillate from (a) with a dienophile selected from a group consisting of fumaric acid and maleic anhydride at a temperature from about 200° C. to about 275° C.;
   (c) taking up the mixture from (b) with ether;
   (d) mechanically removing the insoluble dienophile from (c) and washing the ether solution with water;
   (e) extracting the ether solution from (d) with dilute sodium hydroxide;
   (f) washing the alkaline extract from (e) with ether;
   (g) acidifying the alkaline solution from (f) and extracting with ether;
   (h) washing the ether extract from (g); and
   (i) recovering the Diels-Alder type adduct from the ether extract of (h).
2. The reaction product of claim 1 wherein the dienophile is fumaric acid and the Diels-Alder adduct is the fumaric acid adduct.
3. The reaction product of claim 1 wherein the dienophile is maleic anhydride and the Diels-Alder adduct is the maleic anhydride adduct.
4. A process for preparing a nonoxidizing rosin oil which process comprises:
   (a) distilling a material, selected from a group consisting of gum rosin, wood rosin, and tall oil rosin, in the presence of phosphoric acid at a temperature of about 180° C. to 280° C. and under reduced pressure;
   (b) reacting the distillate from (a) with a dienophile selected from a group consisting of fumaric acid and maleic anhydride at a temperature from about 200° C. to about 275° C.;
   (c) taking up the mixture from (b) with ether;
   (d) mechanically removing the insoluble dienophile from (c) and washing the ether solution with water;
   (e) extracting the ether solution from (d) with dilute sodium hydroxide;
   (f) mechanically separating the alkaline solution from the ether solution from step (e);
   (g) evaporating the ether solution from (f) to recover a nonoxidizing rosin oil.
5. The product of claim 4.

References Cited
UNITED STATES PATENTS

| | | | |
|---|---|---|---|
| 2,994,635 | 8/1961 | Reaville et al. | 260—97.5 |
| 3,400,117 | 10/1968 | D'errico et al. | 260—97.5 |

OTHER REFERENCES

"Encyclopedia of Chemical Technology," 1953, pp. 789 to 791.

DONALD E. CZAJA, Primary Examiner

W. E. PARKER, Assistant Examiner